United States Patent
Jagannatha et al.

(10) Patent No.: US 11,606,303 B1
(45) Date of Patent: Mar. 14, 2023

(54) DEVICE INITIATED QUALITY OF SERVICE

(71) Applicant: Verizon Patent and Licensing Inc., Basking Ridge, NJ (US)

(72) Inventors: Deepa Jagannatha, Bridgewater, NJ (US); Kalyani Bogineni, Irving, TX (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/544,209

(22) Filed: Dec. 7, 2021

(51) Int. Cl.
*H04L 12/24* (2006.01)
*H04W 24/08* (2009.01)
*H04L 47/2475* (2022.01)
*H04L 67/141* (2022.01)

(52) U.S. Cl.
CPC ........ *H04L 47/2475* (2013.01); *H04L 67/141* (2013.01)

(58) Field of Classification Search
CPC ............. H04L 47/2475; H04L 47/2416; H04L 47/2425; H04L 67/141
USPC ........................................................ 709/227
See application file for complete search history.

(56) References Cited

U.S. PATENT DOCUMENTS

| | | | |
|---|---|---|---|
| 10,986,568 B1 * | 4/2021 | Jagannatha | ........... H04W 8/183 |
| 2022/0045917 A1 * | 2/2022 | Uppili | ................. H04L 41/0816 |

FOREIGN PATENT DOCUMENTS

| | | | |
|---|---|---|---|
| WO | WO-2020200254 A1 * | 10/2020 | |
| WO | WO-2022008086 A1 * | 1/2022 | |
| WO | WO-2022048744 A1 * | 3/2022 | |

OTHER PUBLICATIONS

3GPP, "3GPP TS 23.503 V16.10.0 (Sep. 2021)—Policy and charging control framework for the 5G System (5GS)", Sep. 24, 2021, 3GPP , https://portal.3gpp.org/desktopmodules/Specifications/SpecificationDetails.aspx?specificationId=3334 (Year: 2021).*
Zahid Ghadialy, "Network Slicing using User Equipment Route Selection Policy (URSP)", Nov. 11, 2021, The 3G4G Blog, https://blog.3g4g.co.uk/2021/11/network-slicing-using-user-equipment.html#:~:text=Along%20with%20the%20concept%20of,the%20UE%20via%20the%20AMF. (Year: 2021).*
Henrik Basilier et al., "Applied network slicing scenarios in 5G", Feb. 11, 2021, Ericsson Technology Review, https://www.ericsson.com/en/reports-and-papers/ericsson-technology-review/articles/applied-network-slicing-scenarios-in-5g (Year: 2021).*
Ashutosh Kaushik, "Network Slicing—Demystified", Jun. 2, 2020, Linkedin, https://www.linkedin.com/pulse/network-slicing-demystified-ashutosh-kaushik (Year: 2020).*

* cited by examiner

Primary Examiner — Ruolei Zong

(57) ABSTRACT

A method for initiating quality of service levels within a user equipment (UE) device may include receiving application mapping rules from a core network, storing the application mapping rules within the UE device, and determining, by the UE device, a slice service profile (SSP) category associated with an application flow. The method may further include determining, by the UE device, whether an application mapping rule associated with the SSP category is stored within the UE device, and obtaining, from the UE device, a quality of service level for the application flow based on the SSP category, in response to determining that the application mapping rule is stored within the UE device.

20 Claims, 8 Drawing Sheets

| SSP CATEGORIES | QoS Levels | LATENCY | RESOURCE TYPE |
|---|---|---|---|
| Voice | 1, 5 | 100 ms | GBR |
| Streaming | 2,4,5,6,7,8,9,71,72,74, 75, 76, 5 | 100-500 ms | GBR, non-GBR |
| Gaming | 3 | 50 ms | GBR |
| V2X | 74, 79 | 50 ms | GBR, non-GBR |
| Low_Latency | 82, 83, 84, 85 | 5-30 ms | GBR, non-GBR |
| MCPTT | 65, 66, 67, 69, 70 | 60-200 ms | GBR, non-GBR |
| ARVR | 80 | 10 ms | non-GBR |
| FOTA | 8,9 | 300 ms | non-GBR |
| Internet | 7,8,9 | 100-300 ms | non-GBR |
| SUPL | 7 | 300 ms | non-GBR |
| RCS | 8,9 | 300 ms | non-GBR |
| MMS | 7-9 | 300 ms | non-GBR |
| Unified Communications | 10 | 300 ms | non-GBR |

FIG. 3

DEVICE INITIATED QUALITY OF SERVICE

BACKGROUND

Wireless networks may be used for the wireless transmission of various applications and/or types of data flows, such as voice call flows, messaging flows, audio and/or video streaming flows, file download traffic, and/or other types of flows. Different applications may have different Quality of Service (QoS) requirements, routing rules, or the like. For example, voice call flows may have lower latency requirements than file download flows, and file download flows may have higher throughput requirements than voice call flows. Providing information to the wireless network identifying applications generating flows can present challenges due to, among other things, user privacy concerns.

BRIEF DESCRIPTION OF THE DRAWINGS

FIG. 3 shows application mapping rules having values arranged within a table;

DETAILED DESCRIPTION

The following detailed description refers to the accompanying drawings. The same reference numbers in different drawings may identify the same or similar elements. The following detailed description does not limit the invention.

Current wireless standards have defined a capability for a device to request a particular QoS for an application flow (hereinafter "flow"). However, given various user privacy and/or other concerns, a wireless network may lack the ability to determine information regarding the type and/or category of application that requests a particular QoS for exchanging a flow with the wireless network. Accordingly, there may be no way for the network to determine what application category or type is associated with a QoS requested by a UE.

For the network to obtain information about a QoS level which may be, for example, characterized at least in part by a QoS value and an associated application category, embodiments may include a UE that determines an appropriate QoS mapping based on UE route selection protocol (URSP) and slice service profile (SSP) policies. The UE may determine such QoS mapping before requesting a protocol data unit (PDU) session for mapping a flow to an appropriate slice. In an embodiment the UE (e.g., a modem within the UE) may enable a device initiated QoS selection when an SSP category is associated with a slice as assigned in a URSP rule. This may be enabled by having the UE (e.g., the modem) configured to determine whether an appropriate rule is present in the URSP and SSP policies. If a rule is present, the UE may perform a mapping of a QoS value based on an SSP application category. The QoS value may be, for example, for a fifth generation (5G) network, a 5G QoS identifier (5QI) and/or for a long term evolution (LTE) network, a QoS class identifier (QCI).

As used herein, an application flow, or simply a "flow," may be a plurality of packets associated with a particular application type. Each application type may require different networking resources which can be characterized by a variety of QoS parameters indicating the relative priorities of the packets. These priorities can be based upon the resource requirements and latency sensitivities of the application associated with the flow. Using the QoS parameters, flows may be divided into different service categories based on their relative priority. For example, buffered video streaming and email can be classified under the same QoS parameter, and thus receive the same level of service. Different QoS parameters may be used at different networking levels and/or locations within the network. As used herein, a transport network (TN) may be a network that interconnects radio access network (RAN) components (which may be disaggregated instead of a monolithic base station depending upon the RAN architecture) and connects a cell site to a core network.

Figure 1:
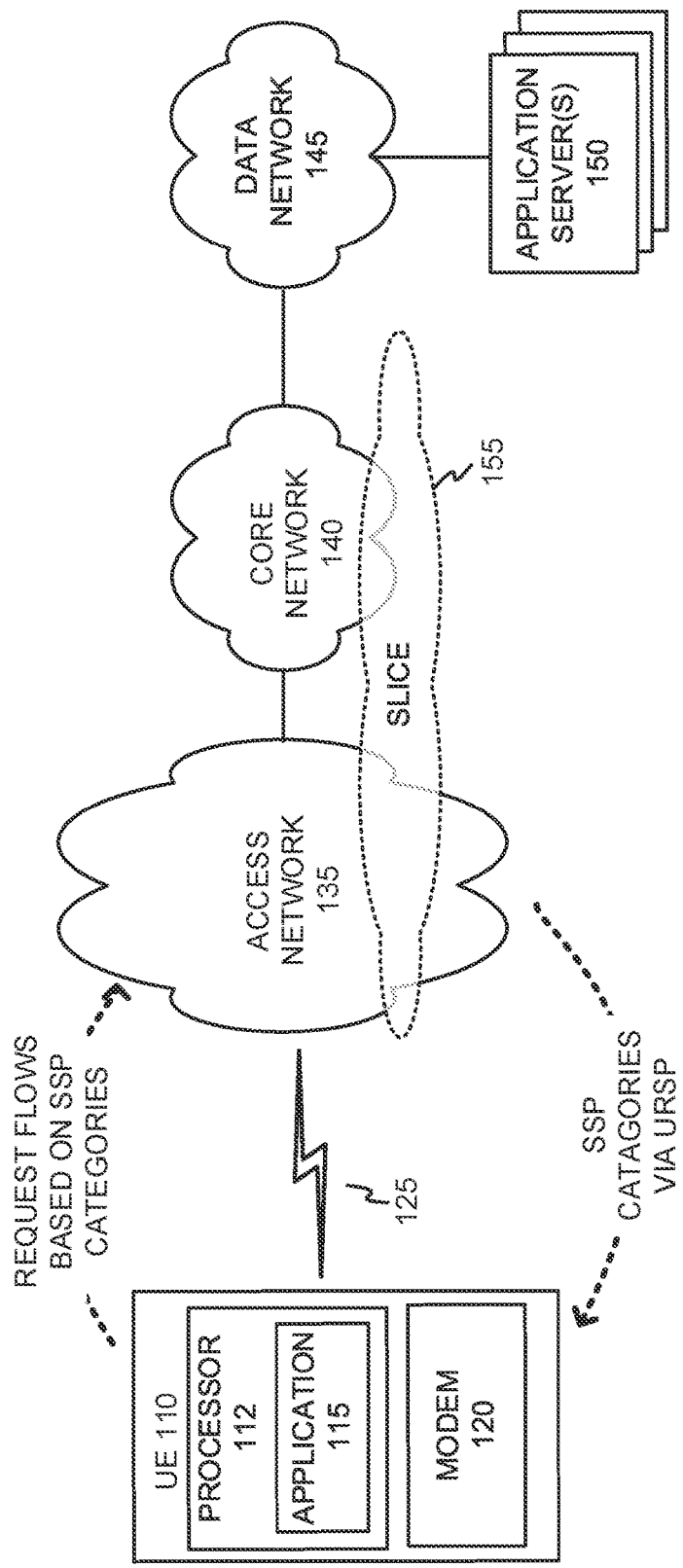
FIG. 1 is a block diagram of an exemplary networking environment where a user equipment device (UE) determines a quality of service for exchanging application flows.

FIG. 1 is a block diagram showing an exemplary network environment 100 where a UE may determine a QoS level for exchanging application flows. The environment may include a UE 110, which may further include a processor 112, and a modem 120. Network environment 100 may further include an access network 135, a core network 140, a data network 145, and one or more application server(s) 150. For ease of explanation, only one UE 110, access network 135, core network 140, and data network 145 are illustrated in network environment 100. However, it should be understood that a plurality of the aforementioned, or other known network entities, may be communicatively coupled to networks 135, 140, and/or 145.

Access network 135 may establish a wireless channel 125 for exchanging information between UE 110 and application server(s) 150 via core network 140 and data network 145. The information exchange may include one or more flows associated with an application 115 that are generated by processor 112 in UE 110. The flows may be characterized by SSP categories associated with the flows (e.g., voice, streaming, gaming, etc.). Initially, the UE 110 may receive the SSP categories from core network 140 within a URSP. The URSP may be pushed to UE 110 via access network 135 prior to exchanging flows. Modem 120 may store the received SSP categories, along with various network performance parameters associated therewith, in non-volatile memory.

Once the modem has stored the SSP categories and their associated network parameters, application 115 may generate the flow(s), and the processor 112 may provide an SSP category associated with each flow to modem 120. The SSP categories may be provided to modem 120 from processor 112 prior to, and/or along with, the application flows. Alternatively, processor 112 may only provide the flow generated by the application, and modem 115 may identify an SSP category corresponding to the application flow. Based on the SSP categories, modem 120 may determine a QoS level for each flow received by processor 112. For example, when core network 140 includes the 5G standard, modem 120 may determine that the QoS level is associated with a particular 5QI value. In another embodiment, when core network 140 includes the LTE standard, modem 120 may determine QoS levels having a particular QCI value. Modem 120 may subsequently send a session request to core network 140 to establish resources for exchanging one or more flows generated by processor 112. For example, when core network 140 is a 5G network, modem 120 may send a PDU session establishment request to core network 140 based on the 5QI values associated with the SSP categories received by processor 112. In another embodiment, when core network 140 is an LTE network, modem 120 may send a request to establish a data bearer based on the QCI levels associated with the SSP categories received by processor 112.

With either 5G or LTE, modem 120 may send a request to have core network 140 and/or access network 135 establish one or more network slices 155 with the appropriate QoS levels (based on the SSP categories) to which the application flows can be mapped. Once the PDU session is established, a flow may be exchanged over slice 155 based upon the QoS level requested by modem 120.

Further referring to FIG. 1, UE 110 may include any type of electronic device having communication capabilities, and thus communicate over access network 135, core network 140, and/or data network 145 using a variety of different channels, including both wired and wireless connections. UE 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). UE 110 may include processor 112 that may provide an operating system for running one or more application(s) 115. An application 115 may include software code which may be executed by processor 112 to provide various user-level functionality. The functionality may include exchanging application flows with application server(s) 150 via access network 135, core network 140, and/or data network 145. In doing so, processor 112 may provide application flows, along with corresponding SSP categories, to modem 120 for exchange with application server(s) 150 via access network 135, core network 140, and/or data network 145. Based on the SSP categories, modem 120 may determine a QoS level for exchanging application flows via one or more slices 155 with application server(s) 150. UE 110 may also include modem 120 that operates in the non-access stratum and thus facilitates signaling and coordination with network devices in access network 135 and/or core network 140. Details of processor 112, modem 120 are described in more detail with reference to FIG. 4.

Further referring to FIG. 1, access network 135 may include a radio access network (RAN) and a transport network (TN). The RAN may establish the wireless channel 125 for exchanging information with UE 110 and application server(s) 150 via TN, core network 140, and data network 145. The RAN may incorporate cell sites that include all-in-one macro base stations (e.g., gNodeBs for the 5G wireless standard and/or an eNodeBs for the LTE wireless standard). Additionally or alternatively, the RAN in access network 135 may include distributed base stations such as, for example, those present in a cloud RAN (C-RAN) architecture. The TN may interconnect RAN components within a C-RAN and also provide data interconnections to core network 140. The RAN may include any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). For example, the RAN may include PLMN(s) having wireless capability for a 5G PLMN, an LTE PLMN, an advanced LTE PLMN, and/or other types of PLMNs not specifically described herein.

Core network 140 may include any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). The PLMN(s) may include a fifth generation (5G) PLMN, a Long Term Evolution (LTE) PLMN, and Advanced LTE PLMN, and/or other types of PLMNs not specifically described herein. Core network 140 may allow the delivery of any type of data service, including Internet Protocol (IP) services to UE 110, and may interface with other networks, such as data network 145. Depending on the implementation, core network 140 may include 4G core network components (e.g., a Serving Gateway (SGW), a Packet data network Gateway (PGW), a Mobility Management Entity (MME), etc.); and/or 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.). Additionally or alternatively, core network 140 may include any other type of network components to support other PLMN standards (e.g., CDMA, LTE-Advanced, etc.).

Data network 145 may include networks that are external to core network 140 for providing various services by exchanging data with other network entities. In some implementations, data network 145 may include packet data networks, such as an Internet Protocol (IP) network. Data network 145 may exchange data with core network 140 to provide UE 110 connectivity to various application servers 150, gateways, and other network entities. Data network 145 may include a wide area network (WAN), a metropolitan area network (MAN), an intranet, the Internet, a wireless satellite network, a cable network, an optical network, etc.

Application server(s) 150 may include one or more devices, such as computer devices, databases, and/or server devices, that facilitate IP or non-IP data delivery services. Such services may include supporting Internet of things (IoT) applications such as alarms, sensors, medical devices, metering devices, smart home devices, wearable devices, retail devices, etc. Other services may be also be supported such as communications applications (e.g., short message service (SMS), etc.), automotive applications, aviation applications, etc. Application server(s) 150 may communicate with UE 110 via core network 140 and access network 135 using IP and/or non-IP channels. Application servers 150 may be supported by service providers associated with various organizations (e.g., companies, non-profits, collaborative enterprises, etc.).

Slice 155 (also referred to as a "network slice 155") may be a logical and/or virtual subnet over a common networking infrastructure. However, a slice may be fully independent and isolated from the public networking infrastructure. Network slices may be used to customize the behavior for different use cases/traffic types and to provide isolation between them. In some embodiments, network slices may be based on 5G network technologies and/or LTE network technologies. As used herein, a slice may be defined as a discrete set of resources, devices, systems, and virtualized network functions having differentiated levels of service within access network 135 and/or core network 140. For example, one particular slice may provide relatively low latency communications and relatively low throughput, another slice may provide relatively high latency communications and relatively high throughput, yet another slice may provide relatively low latency communications and relatively high throughput, and so on.

Using Software-Defined Networking (SDN), Network Functions Virtualization (NFV), orchestration, analytics, and/or automation, slice 155 may be created to support a specific application, service, set of users, and/or network. Slice 155 can span multiple network domains, including access, core, and transport, and be deployed across multiple operators. Slice 155 may have an associated set of requirements that, for example, may be defined from service level requirements that may be applicable to the network slice subnet constituents. The set of service requirements associated with a slice may be referred to herein as slice service profile (SSP).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
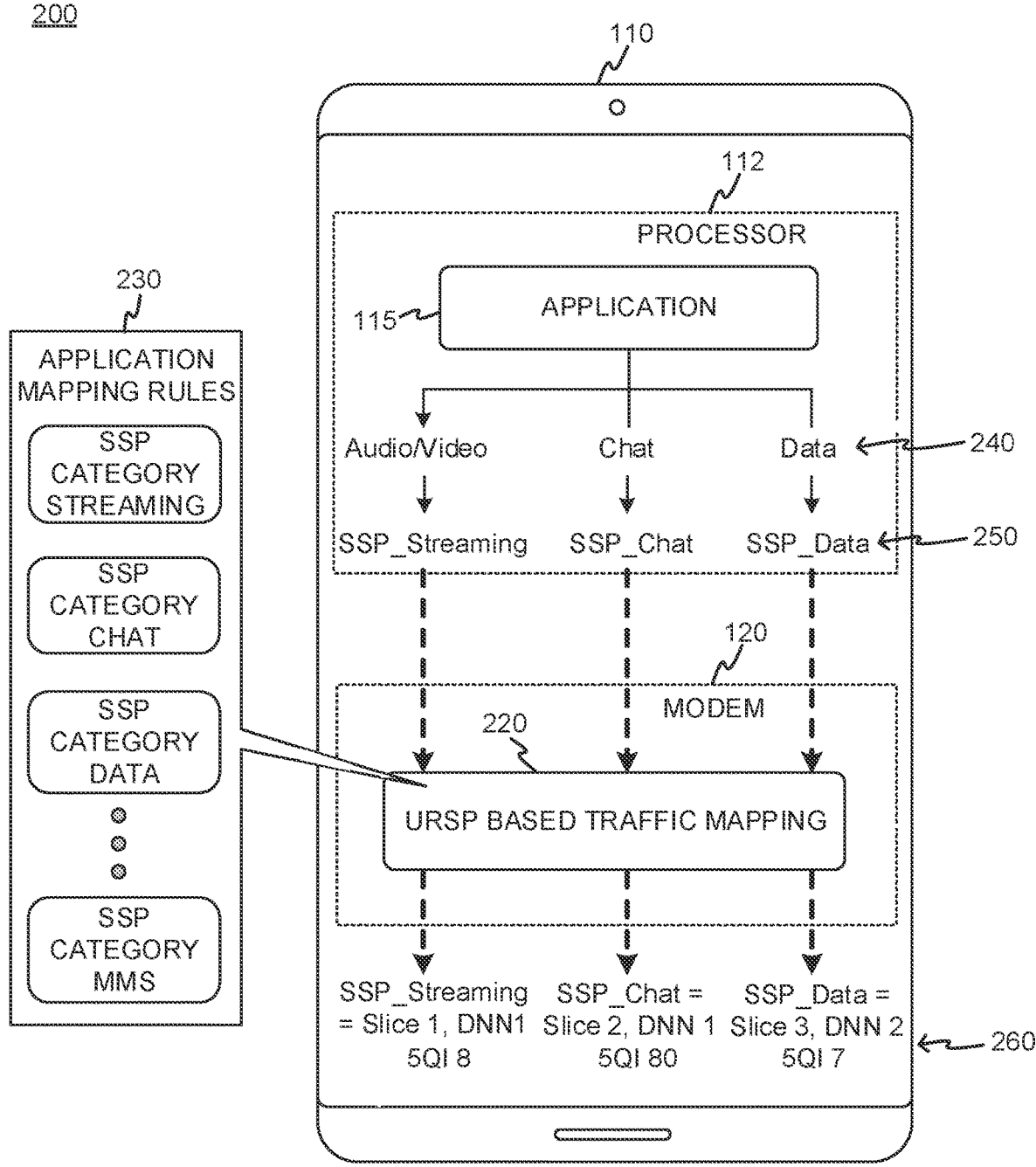
FIG. 2 is an block diagram illustrating an example of a UE determining QoS levels for different flows generated by an application.

FIG. 2 is an block diagram 200 illustrating an example of UE 110 determining QoS levels for different flows generated by application 115. In the embodiment shown in FIG. 2, UE 110 may communicate wirelessly using a 5G network, however, other network standards such as LTE can also applicable in different embodiments.

Application 115 may execute on processor 112 and generate a number of different types of flows 240. For example, if application 115 is a video collaboration application such as, for example, BlueJeans, processor 112 executing application 115 may generate a number of flows 240 which can include audio/video flows, chat flows, and/or data flows (e.g., files storing presentation documents). Processor 112 may also provide, either prior to receiving flows 240 or concurrently therewith, SSP categories 250 that correspond to flows 240 produced by processor 112. For example, as shown in FIG. 2, the Audio/Video flow 240 may be associated with an SSP category 250 of "SSP_Streaming;" the Chat flow 240 may be associated with an SSP category 250 of "SSP_Chat;" and the Data flow 240 may be associated with an SSP category 250 of "SSP_Data." In an alternative embodiment, processor 112 may provide various flows 240 to modem 120 without the associated SSP categories 250, and modem 120 may identify the type of flows 240 after being received from processor 112 and determine the SSP category 250 most appropriate for each received flow 240.

Modem 120 may store application mapping rules 230 for performing UE 110 initiated URSP based traffic mapping on a per flow basis. In an embodiment, modem 120 may generate mapping results 260 before establishing a PDU session. Application mapping rules 230 may include URSP rules with SSP categories that may map to a predetermined slice, where the SSP categories are associated with QoS levels (e.g., 5QI values for 5G, and/or QCI values for LTE) and/or various other network parameters. Other network parameters within application mapping rules 230 (in addition to the QoS levels) that may be associated with SSP categories 250 may include, for example, network latency values and/or latency ranges, resource types such as guaranteed bit rate (GBR) or non-GBR, etc. In an embodiment, a service provider may assign custom QoS levels to particular flows for modem 120 to control in addition to application mapping rules 230. Additional details of application mapping rules 230 are described in reference to FIG. 3.

For example, further referring to FIG. 2, based on application mapping rules 230 stored within modem 120, modem 120 may generate a mapping result 260 of SSP_Streaming category 250 to slice 1 having a 5QI value of 8, along with a data network name 1 (DNN1). Modem 120 may further generate a mapping result 260 of SSP_Chat category 250 to slice 2 having a 5QI value of 80, along data network name 1 (DNN1). Modem 120 may further generate a mapping result 260 of SSP_Data category 250 to slice 3 having a 5QI value of 7, along data network name 2 (DNN2).

In addition to storing logic to perform URSP based traffic mapping, modem 120 may be configured to determine whether the application mapping rules 230 are present, and/or determine whether a particular SSP_category is included within application mapping rules 230. If application mapping rules 230 are not present in modem 120, or if a particular SSP category is not within the stored application mapping rules 230, modem 120 may rely upon a URSP message received from core network 140 to determine a particular QoS level for a given flow.

In the example shown in FIG. 2, UE 110 is presented as wirelessly communicating with a 5G network; however, other embodiments may permit UE 110 to determine QoS levels when exchanging data based on an LTE wireless network standard. For example, modem 120 may determine QoS Class Identifiers (QCIs) for different flows 240. Additionally, modem 120 may determine QCIs for mapping results 260, and flows 240 may be mapped to appropriate data bearers (not shown) associated with slice 155. In an embodiment, UEs 110 which cannot perform flow based mapping may still be able to determine QoS levels based on an identification of application 115 in processor 112.

FIG. 3 shows application mapping rules 230 including various parameters arranged a table 300. The arrangement of table 300 is for purposes of explanation only, and table 300 may be structured using other arrangements and/or other values. As noted above, table 300 may be stored in modem 120, subscriber identity module (SIM), and/or embedded SIM (eSIM) memory, or any other suitable memory within UE 110. Application mapping rules 230 may include parameters suitable for 5G networks (e.g., 5QI) and/or LTE networks (e.g. QCI). Additionally, network operators may add operator defined values to table 300, such as, for example, custom QCI/QoS levels and/or other parameters to different flows.

Application mapping rules 230 may be divided into table 300 by assigning separate columns representing SSP categories 310, QoS levels 320 (5QI/QCI values), latency 330, and/or resource type 340. In an embodiment, SSP categories 310 may represent classes of application flows based on at least one of an application type that generated the application flow, a source represented by the application flow, or an attribute of the application flow. For example, SSP categories 310 may include Voice, Streaming, Gaming, Vehicle to Everything (V2X), Low_Latency, Mission Critical Push To Talk (MCPTT), Augmented Reality/Virtual Reality (ARVR), Firmware Over The Air (FOTA), Internet, Secured User Plane Protocol (SUPL), Rich Communications Services (RCS), Multimedia Messaging Service (MMS), and Unified Communications. QoS levels may include 5QI (for 5G) and QCI (for LTE) and may include one or more numerical values and/or ranges. Latency 330 may include one or more numerical values and/or ranges specified in, for example, milliseconds. Resource Type 340 may include values indicating GBR and/or non-GBR. The QoS levels and other parameters shown in table 300 are for explanation only, and other parameters may be stored in application mapping rules 230.

Figure 4:
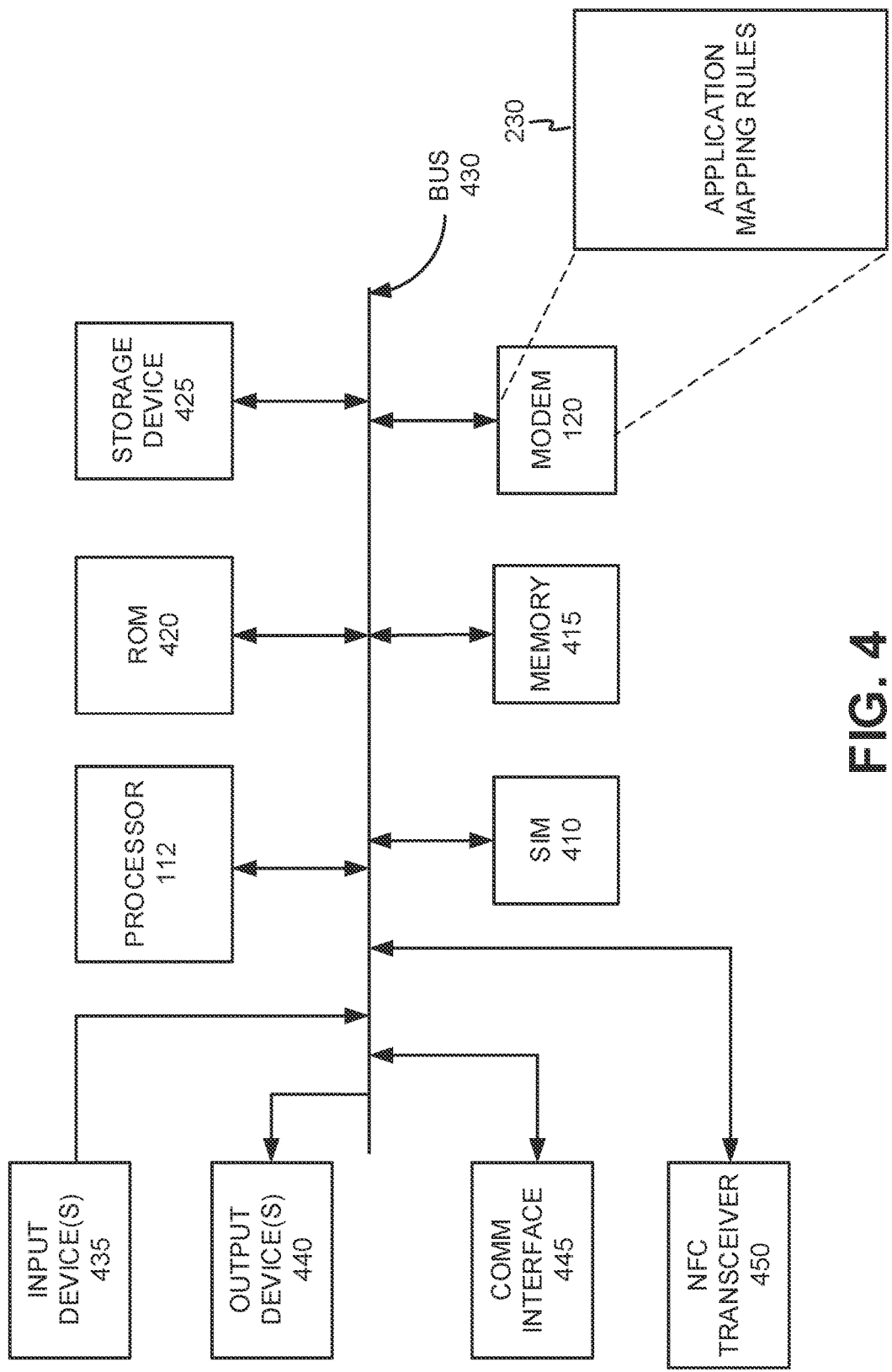
FIG. 4 is a block diagram showing exemplary components of a UE according to an embodiment.

FIG. 4 is a block diagram showing exemplary components of UE 110 according to an embodiment. UE 110 may include processor 112, modem 120, SIM 410, memory 415, read only memory (ROM) 420, storage device 425, input device(s) 435, output device(s) 440, communication interface 445, and/or NFC transceiver 450. Various components of UE 110 may be interconnected by a bus 430.

Processor 112 may include a processor, microprocessor, or processing logic that may interpret and execute instructions. Memory 415 may include a random access memory (RAM) or another type of dynamic storage device that may store data and/or instructions for execution by processor 112. For example, memory 415 may store, in whole or in part, application 115.

Modem 120 may include general purpose and/or specialized processors (e.g., digital signal processors) configured to communicate with access network 135 and core network 140. Modem 120 may further be configured to interface and/or various aspects of control slice 155. Modem 120 may include a memory that can store, in whole or in part, application mapping rules 230.

SIM 410 may be insertable into UE 110 via a smart module interface, which may securely store applications and data (e.g., application mapping rules 230) to permit UE 110 to interoperate with the wireless network. SIM 410 may be embodied as any type of physical SIM card (e.g., a full size SIM, a mini SIM, a micro SIM, a nano SIM, an embedded SIM), embodied as a software module with a Universal Integrated Circuit Card (UICC), a removable user identity card (R-UIM), a universal subscriber identity module (USIM), or an Internet Protocol (IP) multimedia services identity module (ISIM). SIM 410 may be embodied as an integrated circuit chip to securely store user and network parameters, such as, for example, the mobile directory number (MDN), the international mobile subscriber identity (IMSI) number, security authentication and ciphering information (which may be to identify and authenticate subscribers), temporary information related to the local network, a list of the services the user has access to, and passwords which may include a personal identification number (PIN) for ordinary use, and a personal unblocking code (PUK) for PIN unlocking. SIM 410 may include non-volatile memory which may store application mapping rules 230.

ROM 420 may include a ROM device or another type of static storage device that may store static information and instructions for use by processor 112. Storage device 425 may include a magnetic and/or optical recording medium and its corresponding drive.

Input device(s) 435 may include one or more mechanisms that permit an operator to input information to UE 110, such as, for example, a keypad or a keyboard, a microphone, voice recognition and/or biometric mechanisms, etc. Output device(s) 440 may include one or more mechanisms that output information to the operator, including a display, a speaker, etc. Communication interface 445 may include any transceiver mechanism that enables UE 110 to communicate with other devices and/or systems. For example, communication interface 445 may include mechanisms for communicating with another device or system via a network, such as access network 135. A Near Field Communications (NFC) transceiver 450 may interface with bus 430 to permit UE 110 to exchange data with NFC readers, thus allowing convenient transactions with appropriately equipped Point of Sale terminals, kiosks, building security gateways, etc.

UE 110 may perform certain operations or processes, as may be described in detail below. UE 110 may perform these operations in response to processor 112 and/or modem 120 executing software instructions contained in a computer-readable medium, such as memory 420, and/or internal memories within processor 112 and/or modem 120. A computer-readable medium may be defined as a physical or logical memory device. A logical memory device may include memory space within a single physical memory device or spread across multiple physical memory devices. The software instructions may be read into memory 415 from another computer-readable medium, such as storage device 425, or from another device via communication interface 445. The software instructions contained in memory within modem 120 may cause processor modem 120 to perform operations or processes that will be described in detail with respect to FIGS. 7 and 8. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 110 illustrated in FIG. 4 is for illustrative purposes only. It should be understood that other configurations may be implemented. Therefore, UE 110 may include additional, fewer and/or different components than those depicted in FIG. 4.

Figure 5:
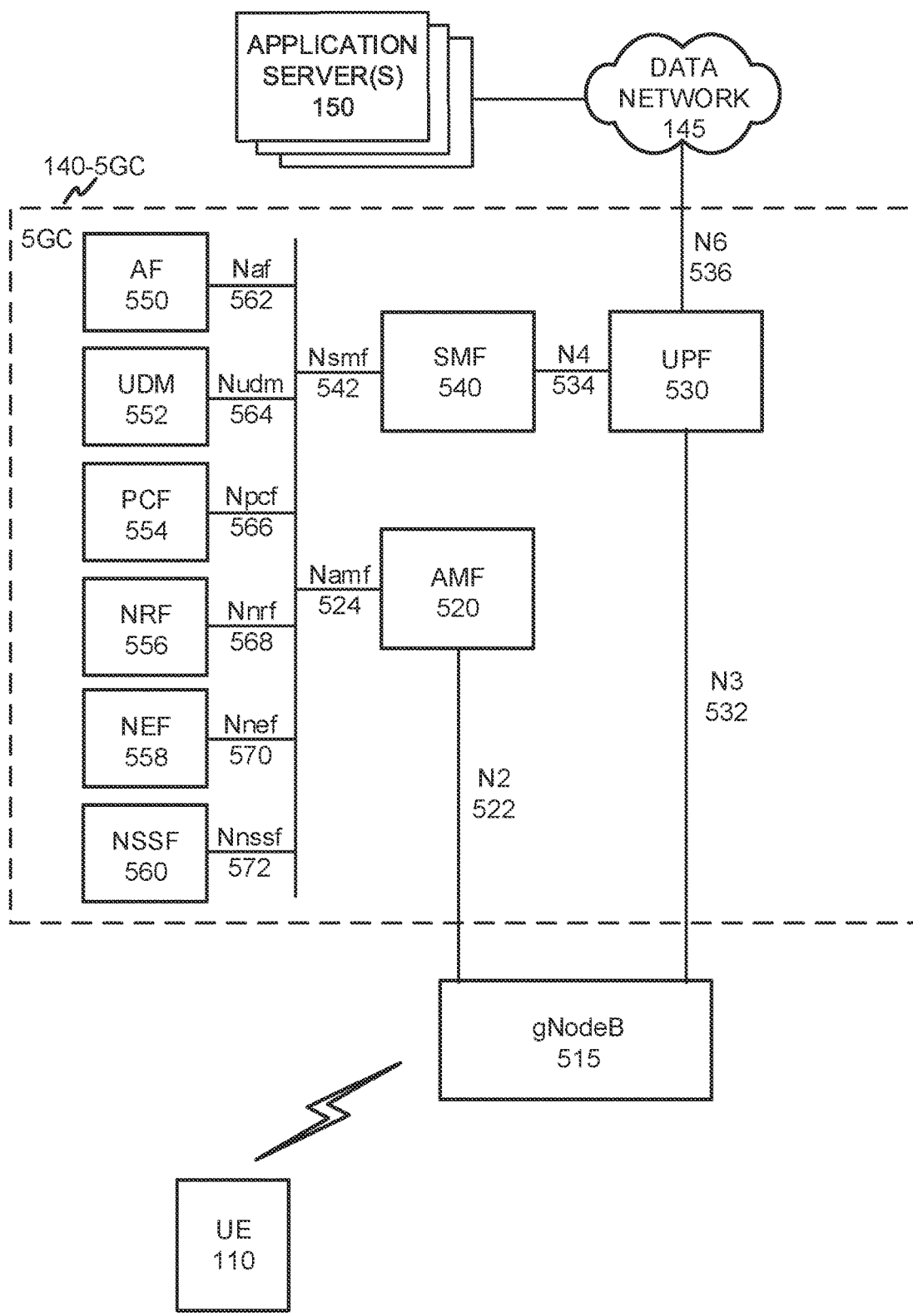
FIG. 5 is a block diagram showing exemplary components of a core network based on the 5G wireless standard.

FIG. 5 is a diagram of a wireless network 500 showing an exemplary core network 140-5GC based on a 5G wireless standard. Core network 140-5GC may interconnect with base station gNodeB 515 to wirelessly exchange data with UE 110 over a radio access technology (RAT) based on 5G air channel interface protocols. Core network 140-5GC may further interconnect with application servers 150 via data network 145.

Core network 140-5GC may include the following network functions (NFs): an Access and Mobility Function (AMF) 520, a User Plane Function (UPF) 530, a Session Management Function (SMF) 540, an Application Function (AF) 550, a Unified Data Management (UDM) 552, a Policy Control Function (PCF) 554, a Network Repository Function (NRF) 556, a Network Exposure Function (NEF) 558, and/or a Network Slice Selection Function (NSSF) 560. While FIG. 5 depicts a single gNodeB 515, AMF 520, UPF 530, SMF 540, AF 550, UDM 552, PCF 554, NRF 556, NEF 558, and/or NSSF 560 for exemplary illustration purposes, in practice, core network 140-5GC may include multiple instances of one or more of the aforementioned network functions and/or components.

GNodeB 515 may include one or more devices (e.g., base stations) and other components and functionality that enable UE 110 to wirelessly connect to access network 135 and core network 140-5GC using a 5G RAT. For example, gNodeB 515 may include one or more cells, with each cell including a wireless transceiver with an antenna array configured for millimeter-wave wireless communication. GNodeB 515 may implement one or more radio access network (RAN) slices to partition core network 140-5GC. GNodeB 515 may communicate with AMF 520 using an N2 interface 522 and communicate with UPF 530 using an N3 interface 532.

AMF 520 may perform registration management, connection management, reachability management, mobility management, lawful intercepts, session management between a UE 110 and SMF 540, access authentication and authorization, location services management, functionality to support non-3GPP provider network, and/or other types of management processes. In some implementations, AMF 520 may implement some or all of the functionality of managing RAN slices in gNodeB 515. AMF 520 may be accessible by other function nodes via a Namf interface 524.

UPF 530 may maintain an anchor point for intra/inter-RAT mobility, maintain an external Packet Data Unit (PDU) point of interconnect to data network 145, perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., gNodeB 515), and/or perform other types of user plane processes. UPF 530 may communicate with SMF 540 using an N4 interface 534 and connect to data network 145 using an N6 interface 536.

SMF 540 may be primarily responsible for interacting with the decoupled data plane, creating, updating, and removing PDU sessions and managing session context with UPF 530. SMF 540 may perform session establishment, modification, and/or release, perform IP address allocation and management, perform Dynamic Host Configuration Protocol (DHCP) functions, perform selection and control of UPF 530, configure traffic steering at UPF 530 to guide traffic to the correct destination, terminate interfaces toward PCF 554, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 240 may be accessible via an Nsmf interface 542.

AF 550 may provide services associated with a particular application, such as, for example, application influence on traffic routing, accessing NEF 558, interacting with a policy framework for policy control, and/or other types of applications. AF 550 may be accessible via a Naf interface 562.

UDM 552 may maintain subscription information for UE 110, manage subscriptions, generate authentication credentials, handle user identification, perform access authorization based on subscription data, perform network function registration management, maintain service and/or session continuity by maintaining assignment of SMF 540 for ongoing sessions, support SMS delivery, support lawful intercept functionality, and/or perform other processes associated with managing user data. UDM 552 may be accessible via a Nudm interface 564.

PCF 554 may support policies to control network behavior, provide policy rules to control plane functions (e.g., to SMF 540), access subscription information relevant to policy decisions, execute policy decisions, and/or perform other types of processes associated with policy enforcement. PCF 554 may be accessible via Npcf interface 566. PCF 554 may specify QoS policies based on QoS flow identity (QFI) consistent with 5G network standards.

NRF 556 may support a service discovery function and maintain a profile of available NF instances and their supported services. An NF profile may include an authorization code that includes a UUID, an NF instance identifier (ID), an NF type, a PLMN ID associated with the NF, a network slice ID associated with the NF, capacity information for the NF, service authorization information for the NF, supported services associated with the NF, endpoint information for each supported service associated with the NF, and/or other types of NF information. NRF 556 may be accessible via an Nnrf interface 568.

NEF 558 may expose capabilities, events, and/or status to other NFs, including third party NFs, AFs, edge computing NFs, and/or other types of NFs. For example, NEF 558 may provide capabilities and events/status of UE 110 to data network 145. Furthermore, NEF 558 may secure provisioning of information from external applications to data network 145, translate information between data network 145 and devices/networks external to data network 145, support a Packet Flow Description (PFD) function, and/or perform other types of network exposure functions. NEF 558 may be accessible via Nnef interface 570.

NSSF 560 may select a set of network slice instances to serve a particular UE 110, determine network slice selection assistance information (NSSAI), determine a particular AMF 520 to serve a particular UE 110, and/or perform other types of processes associated with network slice selection or management. In some implementations, NSSF 560 may implement some or all of the functionality of managing RAN slices in gNodeB 515. NSSF 560 may be accessible via Nnssf interface 572.

Although FIG. 5 shows exemplary components of core network 140-5GC, in other implementations, core network 140-5GC may include fewer components, different components, differently arranged components, or additional components than depicted in FIG. 5. Additionally or alternatively, one or more components of core network 140-5GC may perform functions described as being performed by one or more other components of core network 140-5GC. For example, core network 140-5GC may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 5, additionally or alternatively, core network 140-5GC may include a reference point architecture that includes point-to-point interfaces between particular function nodes.

Figure 6:
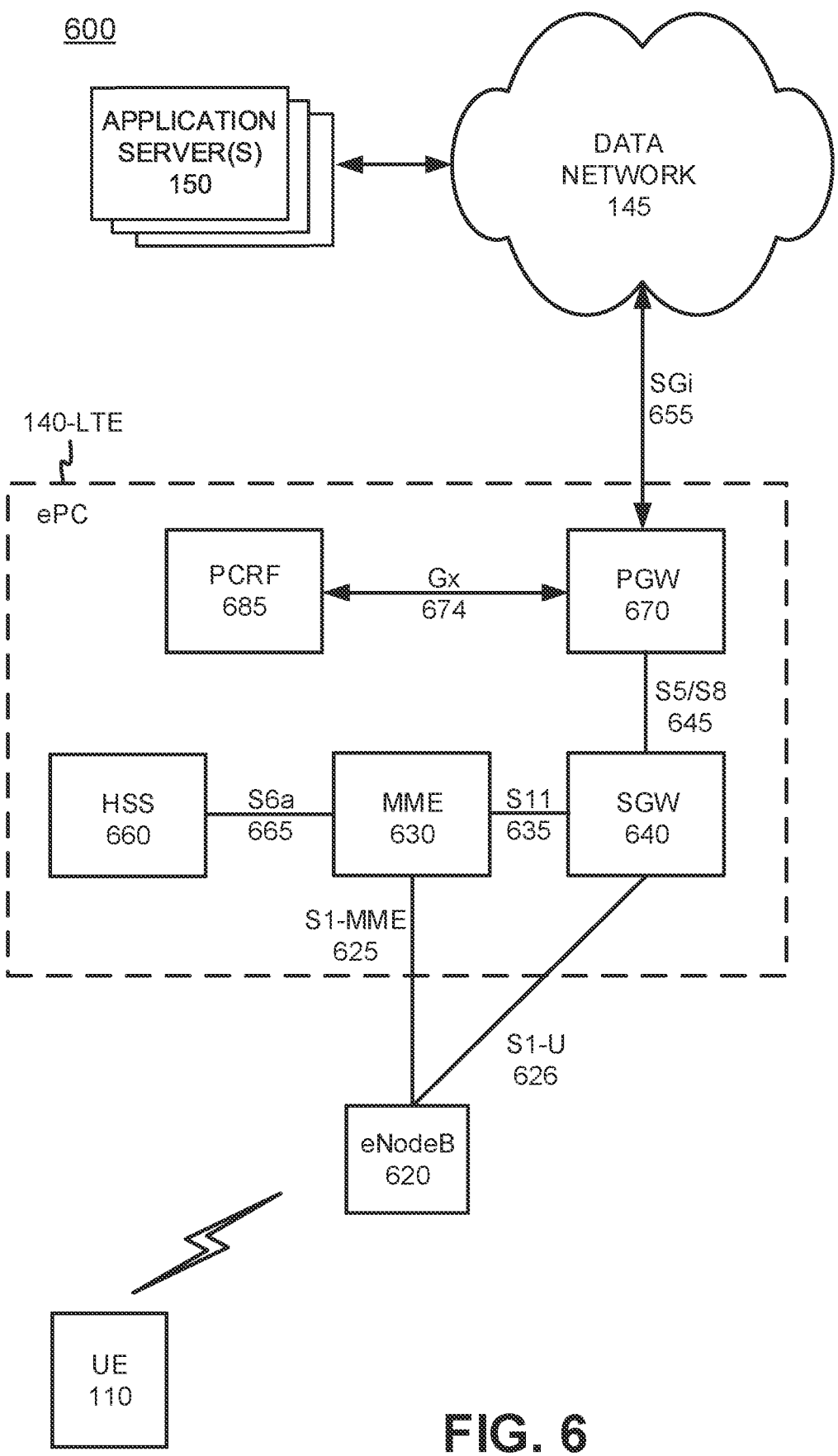
FIG. 6 is a block diagram showing exemplary components of a core network based on the LTE wireless standard.

FIG. 6 is a diagram of a wireless network 600 showing an exemplary core network 140-LTE based on an LTE wireless standard. Core network 140-LTE may wirelessly interconnect with base station eNodeB 620 to exchange data with UE 110 over a RAT based on LTE air channel interface protocols. Core network 140-LTE may further interconnect with application servers 150 via data network 145. Data network 145 may include an Internet Protocol (IP) network and/or a non-IP network. Application server(s) 150 may be connected to data network 145 over a wired or wireless connection, using, for example, transmission control protocol/internet protocol (TCP/IP) and/or using a non-IP based protocol.

Core network 140-LTE may include one or more devices that are physical and/or logical entities interconnected via standardized interfaces. Core network 140-LTE provides wireless packet-switched services and wireless packet connectivity to user devices to provide, for example, data, voice, and/or multimedia services. Core network 140-LTE may further include a mobility management entity (MME) 630, a serving gateway (SGW) 640, a home subscriber server (HSS) 660, a packet data network gateway (PGW) 670, a Policy and Charging Rules Function (PCRF) 685. It is noted that FIG. 6 depicts a representative wireless network 600 with exemplary components and configuration shown for purposes of explanation. Other embodiments may include additional or different network entities in alternative configurations than which are illustrated in FIG. 6.

Further referring to FIG. 6, eNodeB 620 may include one or more devices and other components having functionality that allows UE 110 to wirelessly connect via the RAT of eNodeB 620. ENodeB 620 may interface with core network 140-LTE via a S1 interface, which may be split into a control plane S1-MME interface 625 and a data plane S1-U interface 626. Specifically, eNodeB 620 may interface with MME 630 via S1-MME interface 625, and interface with SGW 640 via S1-U interface 626. S1-U interface 626 may be implemented, for example, using general packet radio service (GPRS) tunneling protocol (GTP). S1-MME interface 625 may be implemented, for example, with a protocol stack that includes a Non-Access Stratum (NAS) protocol and/or Stream Control Transmission Protocol (SCTP).

MME 630 may implement control plane processing for both the primary access network and the secondary access network. For example, through eNodeB 620, MME 630 may implement tracking and paging procedures for UE 110, may activate and deactivate bearers for UE 110, and may authenticate a user of UE 110 to provide normal coverage service for operating in normal UE device mode. MME 630 may also select a particular SGW 640 for a particular UE 110. MME 630 may interface with other MMEs 630 (not shown) in core network 140-LTE and may send and receive information associated with UEs 110, which may allow one MME 630 to take over control plane processing of UEs serviced by another MME 630, if the other MME 630 becomes unavailable.

SGW 640 may provide an access point to and from UE 110, may handle forwarding of data packets for UE 110, and may act as a local anchor point during handover procedures between eNodeBs 620. SGW 640 may interface with PGW 670 through an S5/S8 interface 645. S5/S8 interface 645 may be implemented, for example, using GTP.

PGW 670 may function as a gateway to data network 145 through a SGi interface 655. Data network 145 may provide various services (e.g., over the top voice services) to UE 110. A particular UE 110, while connected to a single SGW 640, may be connected to multiple PGWs 670, one for each packet network with which UE 110 communicates.

Alternatively, UE 110 may exchange data with data network 145 though a WiFi wireless access point (WAP) (not shown). The WiFi WAP may be part of a local area network, and interconnect to data network 145 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 630 may communicate with SGW 640 through an S11 interface 635. S11 interface 635 may be implemented, for example, using GTPv2. S11 interface 635 may be used to create and manage a new session for a particular UE 110. S11 interface 635 may be activated when MME 630 needs to communicate with SGW 640, such as when the particular UE 110 attaches to core network 140-LTE, when bearers need to be added or modified for an existing session for the particular UE 110, when a connection to a new PGW 670 needs to be created, or during a handover procedure (e.g., when the particular UE 110 needs to switch to a different SGW 640).

HSS 660 may store information associated with UE 110 and/or information associated with users of UE 110. For example, HSS 660 may store user profiles that include registration, authentication, and access authorization information. MME 630 may communicate with HSS 660 through an S6a interface 665. S6a interface 665 may be implemented, for example, using a Diameter protocol.

PCRF 685 provides policy control decision and flow based charging control functionalities. PCRF 685 may provide network control regarding service flow detection, gating, QoS and flow based charging, etc. PCRF 685 may determine how a certain service flow shall be treated, and may ensure that user plane traffic mapping and treatment is in accordance with a user's subscription profile based, for example, on a specified QCI. PCRF 685 allows users to receive services according to the contract, meaning that services are charged accordingly. PCRF 685 may communicate with PGW 670 using a Gx interface 674. Gx interface 674 may be implemented, for example, using a Diameter protocol.

While FIG. 6 shows exemplary components of core network 140-LTE, in other implementations, core network 140-LTE may include fewer components, different components, differently arranged components, or additional components than depicted in FIG. 2. Additionally or alternatively, one or more components of core network 140-LTE may perform functions described as being performed by one or more other components of core network 140-LTE.

Figure 7:
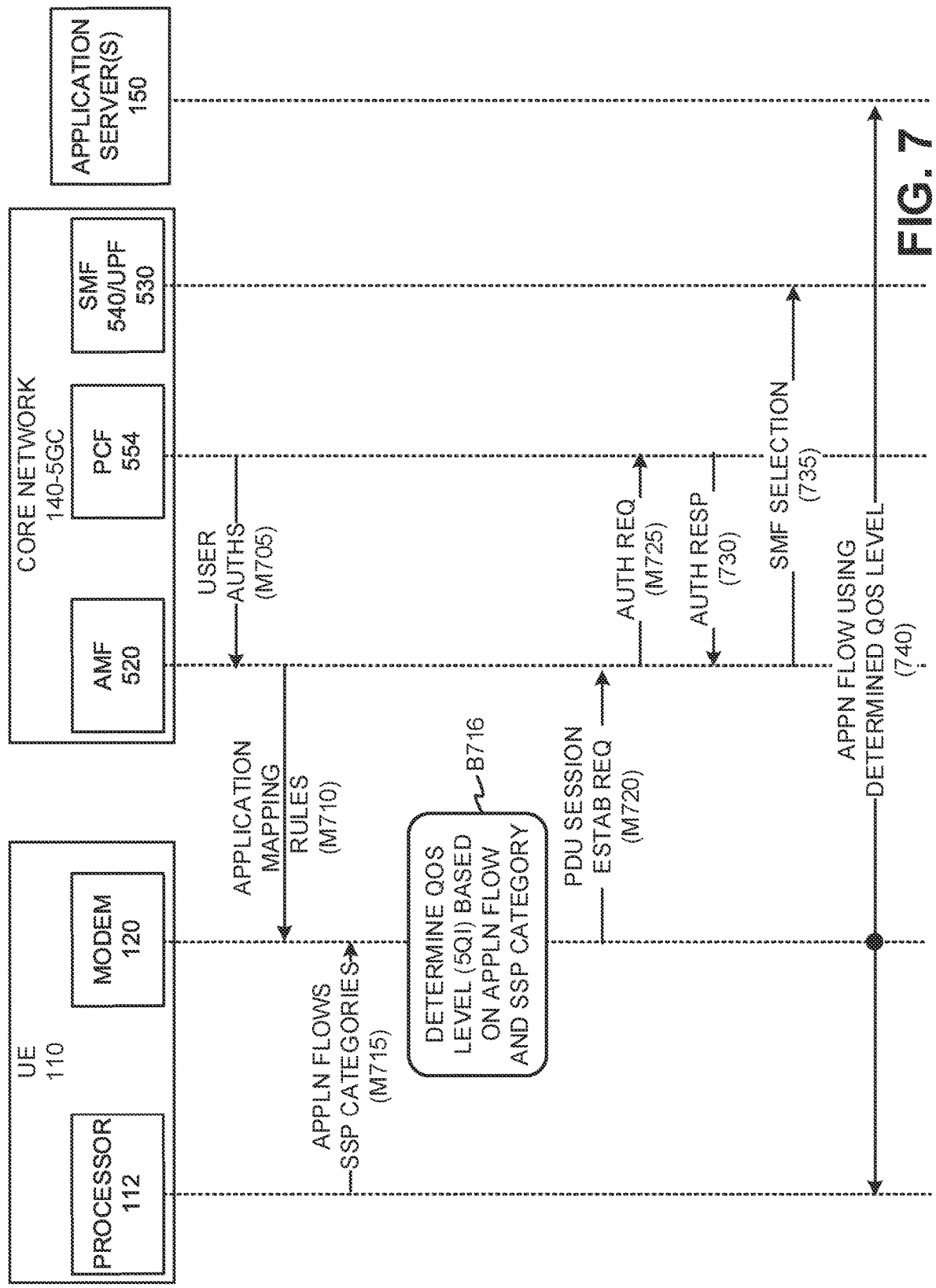
FIG. 7 is an exemplary signal flow diagram illustrating communications between network entities associated with device initiated QoS.

FIG. 7 is an exemplary signal flow diagram illustrating communications between network entities associated with device initiated QoS. In the embodiment shown in FIG. 7, network entities are associated with a 5G network; however, other network standards such as LTE may be applicable in different embodiments as described in more detail below.

Prior to exchanging flows associated with applications between UE 110 and core network 140-5GC, PCF 544 may provide user authentication information to AMF 520 (M705). Such information may be based on subscription data associated with the user, which may include, for example, types and/or levels of the services for which the user has subscribed. Such information may include, for example, an identifier of the services (e.g., BlueJeans, Netflix, etc.), the network source identifier of the services (e.g., data network names (DNNs) for application server(s) 150), levels and/or limits associated with the services (e.g., permitted time durations of communications, number of participants allowed, video quality, etc.). Based on user authentication information in message M705, AMF 520 may provide application mapping rules 230 to UE 110 for storage in modem 120 (M710). Application mapping rules 230 may be included in a URSP message, which may further include SSP categories and/or information regarding status of slice 155. Once application mapping rules 230 are received and stored in memory of modem 120, application mapping rules 230 may be used when processor generates and sends one or more application flows 240 to modem 120, along with SSP categories 250 associated with each application flow 240 (M715).

Upon receiving application flows 240 and SSP categories 250 in M715 from processor 112, modem 120 may determine a QoS level for each received application flow 240 based on SSP categories 250 received in message M715 (Block B716). For example, the QoS levels that modem 120 may specify can include 5QI values, latencies, and/or resource types (GBR/non-GBR) for the application flows 240. In an alternative embodiment, processor 112 may only send application flows 240 to modem 120, and modem 120 may perform an analysis to identify an SSP category 250 most appropriated for each received flow 240. While not shown in FIG. 7, modem 120 may identify in Block B716 whether a received and/or determined SSP category 250 is stored the memory of modem 120 (e.g., whether SSP category 250 is listed in table 300). If the SSP category 250 is not stored in modem 120, modem 120 may request core network 140-5GC to provide QoS levels in a conventional manner (e.g., via a URSP message).

Once the mapping results 260 have been determined and the 5QI values, along with, for example, one or more DNNs and/or slice identifiers, modem 120 may send a PDU session establishment request to AMF 520 for starting a PDU session (M720). In an embodiment, the PDU session establishment request M720 may provide the QoS levels to core network 140-5GC. For example, message M720 may include a 5QCI value for the session. AMF 520 may exchange authorization information with PCF 554 to authorize user (e.g., authorization request M725 and authorization response M730), and then AMF 520 may select an SMF 540 to establish and manage a PDU session, and subsequently SMF 540 may push policy information to UPF 530 (not shown). Using the established PDU session, UE 110 may exchange one or more application flow using the QoS levels determined by modem 120 (e.g., 5QCI values, latency, resource type, etc.) associated with one or more SSP categories 250 (M740). Access network 135, core network 140, and data network 145 may then support the identified QoS level for the session via one or more slices 155.

As noted above, signals flows illustrated in FIG. 7 are shown with network entities that may be associated with a 5G wireless network. However, in a different embodiment, the signals flows may be associated with an LTE wireless network with the appropriate network entities. For example, in an LTE network, core network 140-LTE would be shown in FIG. 7 instead of core network 140-5GC; MME 630 may replace AMF 520, PCRF 685 may replace PCF 554, PGW 670 (user plane) may replace UPF 530, and PGW 670 (control plane) may replace UPF 530. The QoS levels determined by modem 120 may include QCIs instead of 5QIs.

Figure 8:
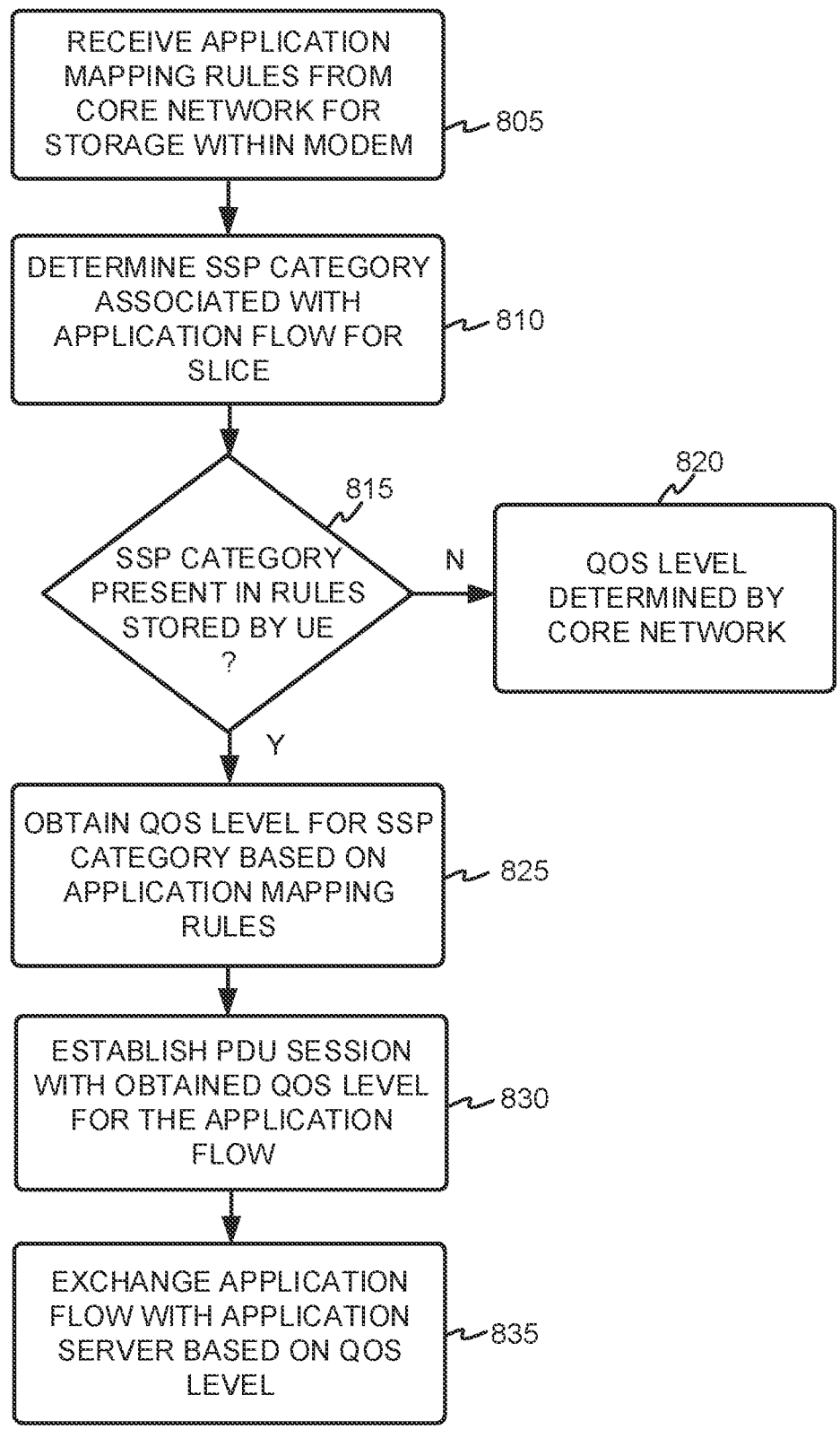
FIG. 8 is a flow chart showing an exemplary process for device initiated QoS.

FIG. 8 is a flow chart showing an exemplary process 800 for executing device initiated QoS. Process 800 illustrates operations which may take place within UE 110 (e.g., modem 120) based on instructions and/or data stored therein. Initially, modem 120 may receive application mapping rules 230 from core network, and store application mapping rules 230 in memory residing within modem 120 (Block 805). Subsequently, modem 120 may receive application flows 240 from processor 112. In an embodiment, modem may further receive SSP categories 250 from processor 112 that are associated with the received application flows 240. Modem 120 may determine SSP categories 250 by associating an SSP category 250 received from processor 112 with an application flow 240 (Block 810). Alternatively, if SSP categories 250 are not provided by processor 112, modem 120 may identify an SSP category 250 for each application flow 240 received from processor 112. Modem 120 may then determine whether the SSP categories 250 determined in Block 810 are present in application mapping rules 230 within modem 120 memory (Block 815). If the determined SSP categories 250 are not present in application mapping rules 230, QoS levels may be determined by core network 140 (Block 820).

Alternatively, when modem 120 determines that one or more of the SSP categories 250 determined in Block 810 are present in application mapping rules 230, modem 120 may use application mapping rules 230 to obtain mapping results 260 that include a QoS level for each SSP category determined in Block 810 (Block 825). The QoS levels may include parameters such as, for example, 5QI values, latency values, resource type values, etc. Modem 120 may establish one or more PDU sessions with the obtained QoS levels for application flows 240 (Block 830), and exchange one or more application flows 240 with application server(s) 150 (Block 835). Access network 135 and/or core network 140-5GC may support the identified QoS levels for the session.

For the exemplary process 800 described above, UE 110 wirelessly connected to core network 140 based on the 5G standard. However, in another embodiment, FIG. 8 may illustrate how UE 110 may determine QoS levels based on the LTE standard. For example, when determining QoS levels in Block 825, modem 120 may determine QoS Class Identifiers (QCIs) for different application flows 240 instead of 5QIs. Additionally, application flows 240 may be mapped to appropriate data bearers (not shown) associated with slice 155 instead of PDU sessions.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 7-8, the order of the messages and/or blocks may be modified in other embodiments. Further, non-dependent messaging and/or processing blocks may be implemented in parallel.

Further, certain portions of the invention may be implemented as "logic" or a "unit" that performs one or more functions. This logic or unit may include hardware, such as one or more modems, processors, microprocessors, application specific integrated circuits, or field programmable gate arrays, or other processing logic, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, groups, or other entities, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

What is claimed is:

1. A method, comprising:
receiving multiple application mapping rules from a core network;
storing the multiple application mapping rules within a user equipment (UE) device;
determining, by the UE device, a first slice service profile (SSP) category associated with a first application flow of multiple application flows generated by an application;
determining, by the UE device, that a first application mapping rule of the multiple application mapping rules corresponds to the first SSP category;
obtaining, from the UE device, a first quality of service (QoS) level for the first application flow based on the first SSP category according to the first application mapping rule;
determining, by the UE device, a second SSP category associated with a second application flow of the multiple application flows;
determining, by the UE device, that none of the multiple application mapping rules correspond to the second SSP category; and
receiving, by the UE device and from the core network responsive to a request, a second QoS level for the second application flow based on the second SSP category.

2. The method according to claim 1, further comprising:
establishing a packet data protocol (PDU) session based on the first QoS level; and
exchanging data associated with the first application flow with an application server via a network slice based on the first QoS level.

3. The method of claim 1, wherein receiving the multiple application mapping rules from a core network further comprises:
receiving a plurality of SSP categories associated with the multiple application flows, from a fifth generation (5G) core network.

4. The method of claim 3, wherein the plurality of SSP categories represent classes of application flows based on at least one of an application type that generated the application flow, a source represented by the application flow, or an attribute of the application flow.

5. The method of claim 4, wherein the plurality of SSP categories include at least one of a 5G QoS identifier value, a latency range, or a resource type.

6. The method of claim 1, wherein receiving the second QoS level comprises:
obtaining the second QoS level via a UE device route selection protocol message from the core network.

7. The method of claim 1, wherein one or more values associated with the multiple application mapping rules are defined by a network operator for custom QoS levels and other parameters for predefined application flows.

8. A device, comprising:
a memory;
a communication interface; and
a modem coupled to the communication interface and the memory, wherein the modem is configured to:
receive multiple application mapping rules from a core network;
store the multiple application mapping rules in the memory;
determine a first slice service profile (SSP) category associated with a first application flow of multiple application flows generated by an application;
determine that a first application mapping rule of the multiple application mapping rules corresponds to the first SSP category;
obtain from the memory a first quality of service (QoS) level for the first application flow based on the first SSP category according to the first application mapping rule;
determine a second SSP category associated with a second application flow of the multiple application flows;
determine that none of the multiple application mapping rules correspond to the second SSP category; and
receive, from the core network responsive to a request, a second QoS level for the second application flow based on the second SSP category.

9. The device according to claim 8, wherein the modem is further configured to:
establish a packet data protocol (PDU) session based on the first QoS level; and
exchange data associated with the first application flow with an application server via a network slice based on the first QoS level.

10. The device of claim 8, wherein when receiving the multiple application mapping rules from a core network, the modem is further configured to:
receive a plurality of SSP categories associated with the multiple application flows from a fifth generation (5G) core network.

11. The device of claim 10, wherein the plurality of SSP categories represent classes of application flows based on at least one of an application type that generated the application flow, a source represented by the application flow, or an attribute of the application flow.

12. The device of claim 11, wherein the plurality of SSP categories include at least one of a 5G quality of service identifier value, a latency range, or a resource type.

13. The device of claim 8, wherein the modem is further configured to:
obtain the second QoS level via a UE device route selection protocol message from the core network.

14. The device of claim 8, wherein one or more values associated with the multiple application mapping rules are defined by a network operator for custom QoS levels and other parameters for predefined application flows.

15. A non-transitory computer-readable medium comprising instructions, which, when executed by a modem included in a user equipment (UE) device, causes the modem to:
receive multiple application mapping rules from a core network;
store the multiple application mapping rules within the UE device;

determine a first slice service profile (SSP) category associated with a first application flow of multiple application flows generated by an application;
determine that a first application mapping rule of the multiple application mapping rules corresponds to the first SSP category;
obtain, from the UE device, a first quality of service (QoS) level for the first application flow based on the first SSP category according to the first application mapping rule;
determine a second SSP category associated with a second application flow of the multiple application flows;
determine that none of the multiple application mapping rules correspond to the second SSP category; and
receive, from the core network responsive to a request, a second QoS level for the second application flow based on the second SSP category.

16. The non-transitory computer-readable medium of claim 15, wherein the instructions further cause the modem to:
establish a packet data protocol (PDU) session based on the first QoS level; and
exchange data associated the first application flow with an application server via a network slice based on the first QoS level.

17. The non-transitory computer-readable medium of claim 15, wherein the instructions to receive multiple application mapping rules from a core network further cause the modem to:
receive a plurality of SSP categories associated with the multiple application flows from a fifth generation (5G) core network.

18. The non-transitory computer-readable medium of claim 17, wherein the plurality of SSP categories represent classes of application flows based on at least one of an application type that generated the application flow, a source represented by the application flow, or an attribute of the application flow.

19. The non-transitory computer-readable medium of claim 18, wherein the plurality of SSP categories include at least one of a 5G quality of service identifier value, a latency range, or a resource type.

20. The non-transitory computer-readable medium of claim 15, wherein the instructions further cause the modem to:
obtain the second QoS level via a UE route selection protocol message from the core network.

* * * * *